(12) United States Patent
Want et al.

(10) Patent No.: US 9,413,872 B2
(45) Date of Patent: Aug. 9, 2016

(54) MOTION TO CONNECT TO KIOSK

(71) Applicant: Google Inc., Mountain View, CA (US)

(72) Inventors: Roy Want, Los Altos, CA (US); William N. Schilit, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/657,120

(22) Filed: Mar. 13, 2015

(65) Prior Publication Data

US 2015/0271312 A1    Sep. 24, 2015

Related U.S. Application Data

(60) Provisional application No. 61/955,345, filed on Mar. 19, 2014.

(51) Int. Cl.
*H04M 1/725* (2006.01)
*H04W 4/02* (2009.01)

(52) U.S. Cl.
CPC ............ *H04M 1/7253* (2013.01); *H04W 4/026* (2013.01); *H04M 2250/12* (2013.01)

(58) Field of Classification Search
CPC .......... H04M 1/72533; H04M 1/7253; H04M 2250/02; H04W 88/02; G08C 17/02
See application file for complete search history.

(56) References Cited

U.S. PATENT DOCUMENTS

| | | | |
|---|---|---|---|
| 7,427,926 B2 | 9/2008 | Sinclair et al. | |
| 7,907,901 B1 | 3/2011 | Kahn et al. | |
| 8,488,010 B2 | 7/2013 | Voss et al. | |
| 2009/0290014 A1* | 11/2009 | Takata | G06F 1/1626 348/61 |
| 2014/0035761 A1 | 2/2014 | Burton et al. | |
| 2014/0327617 A1* | 11/2014 | Wu | G06F 3/0338 345/158 |

FOREIGN PATENT DOCUMENTS

| | | |
|---|---|---|
| WO | 2010/056392 | 5/2010 |
| WO | 2014/075293 | 5/2014 |

* cited by examiner

*Primary Examiner* — Ted Wang
(74) *Attorney, Agent, or Firm* — Fish & Richardson P.C.

(57) ABSTRACT

A user may associate an electronic device such as a smartphone with a public device by imitating a pattern for a target with a gesture of the mobile device. The physical movement of the smartphone may be compared to the movement data for the target. If there is a match, the public device and the electronic device may be associated with one another. The association may allow a user to interact with the public device using the smartphone.

19 Claims, 6 Drawing Sheets

MOTION TO CONNECT TO KIOSK

BACKGROUND

Many multi-device products and applications require sharing an "association key" as a component of their setup and/or use. For example, cordless phones typically require a personal identification number ("PIN") code shared between the handset and a base station. As another example, wireless access points may require a WEP password shared between the client and the access point. Smart displays are becoming popular in many locations (e.g., an interactive mall directory, LCD store signs, smart TVs, etc.) and offer an opportunity for a user to pair a device, such as a smartphone, with the smart display to interact with it.

Associating a phone and a display may be relevant in a variety of applications such as multi-device games including TV games played through a mobile device. Similarly, applications that use phones as controllers, such as TV shopping sites that use the phone for input and/or public displays that share coupons with phones, may require an association between a mobile device and the display. A variety of techniques exist to perform the pairing such as displaying an alphanumeric code and having a user enter the code. Another technique may display an image or QR code and ask the user to take a picture thereof.

BRIEF SUMMARY

According to an implementation of the disclosed subject matter, a server may receive first movement data for a first target on a display of a public device. It may receive first orientation data for a first electronic device that is distinct from the public device. The server may be at a different location than the public device and the first electronic device. The first movement data may be determined to match the first orientation data. The public device may be associated with the first electronic device based on the determination of a match.

In an implementation, a server is disclosed that is configured to receive first movement data for a first target on a display of a public device. The server may receive first orientation data for a first electronic device that is distinct from the public device. The server may be at a different location than the public device and the first electronic device. The server may be configured to determine that the first movement data matches the first orientation data and associate the public device with the first electronic device based on the determination of a match.

A system is disclosed that includes a server configured to send first movement data for a first target on a display of a public device. The server may receive first orientation data for a first electronic device that is distinct from the public device. The server may be at a different location than (and physically distinct from) the public device and the first electronic device. The server may be configured to determine that the first movement data matches the first orientation data. It may associate the public device with the first electronic device. The association between the electronic device and the public device may be based on the determination that the first movement data matches the first orientation data.

In an implementation, a system according to the presently disclosed subject matter includes a means for receiving and/or sending a first movement data for a first target on a display of a public device. The system may include a means to receive a first orientation data for a first electronic device that is distinct from the public device. The system may include a means for determining that the first movement data matches the first orientation data and associating the public device with the first electronic device.

As disclosed herein, a server may send or provide instructions for first movement data for a first target to a public device. The public device may include a display on which the first target is shown. The server may receive first orientation data for a first electronic device that is distinct from the public device. The server may be at a different physical location than the public device and the first electronic device. The server may determine that the first movement data matches the first orientation data. The public device may be associated with the first electronic device. The association may be based on the determination that the first movement data matches the first orientation data.

In an implementation, a system according to the presently disclosed subject matter includes a means for receiving first movement data for a first target on a display of a public device. In some configurations, the system may include a means for sending the first movement data for the first target to the public device. In such configurations, it may, therefore, not be required that the system receives the first movement data from the public device because it already knows what the movement data are. The system may include a means for receiving first orientation data for a first electronic device that is distinct from the public device. The system may include a means for determining that the first movement data matches the first orientation data and a means for associating the public device with the first electronic device. The association may be based on a determination that the first movement data matches the first orientation data.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
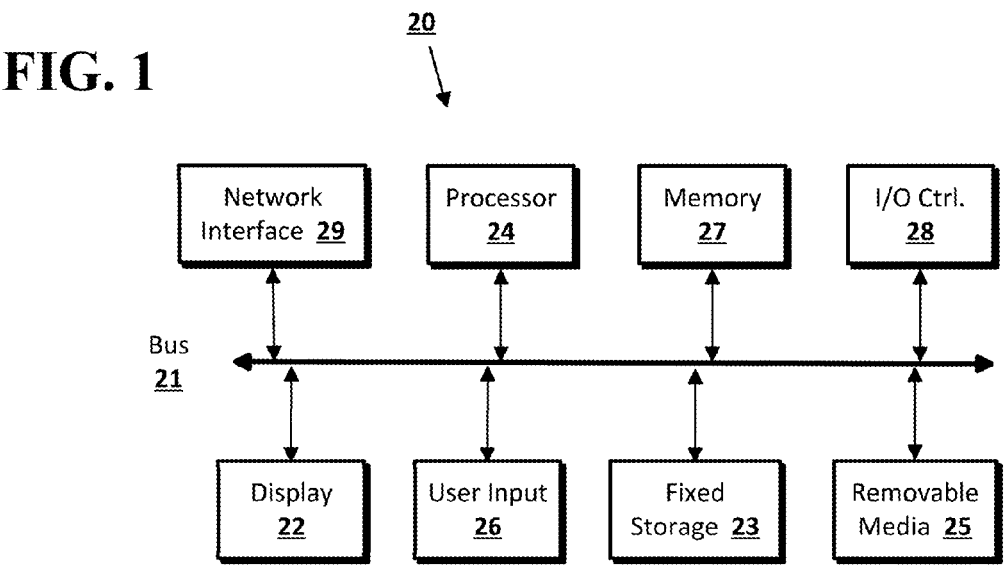
FIG. 1 shows a computer according to an implementation of the disclosed subject matter.

As disclosed herein, a motion-based technique may be utilized to connect a mobile device (e.g., a smartphone or tablet) to a public device. The mobile device, therefore, must know that it is in front of a particular public device (e.g., public display). The association between the two devices, the mobile device and the public display, may be based on a gesture and a motion. For example, the public device may direct a user to follow a target, such as a bouncing ball, that is shown on the display with the user's mobile device. The motion may be, for example, a shaking motion, a predefined path of a target, or a combination thereof. Matching the visual data on the screen with the accelerometer sensor data from the mobile device's inertial measurement unit ("IMU"), for example, may provide a fast, reliable, and fun technique for associating the two devices.

In an implementation, a determination is made that a particular mobile device belonging to a user is in front of a particular public display. As disclosed herein, a gated path may be created between a cloud-based service that controls the public display and a user's mobile device after an association between the public display and the mobile device is made. In some configurations, a user may have a web browser, or application operating on the mobile device, access a web page that uses, for example, JavaScript and/or HTML5 to capture accelerometer data (or other IMU-based data) from the mobile device. The public display may show an application waiting for a user connection and instructions for a user to move the mobile device at a particular tempo and/or at least one direction. A user, therefore, may mimic with the user's mobile device a gesture as defined by a target on the public display (e.g., a bouncing ball or racecar making left and/or right turns). The public display may show an indication of a person making a gesture. The orientation data based on the user moving the mobile device may be received by a cloud service temporally near (e.g., less than two minutes) the time at which the public display has shown a particular pattern. This may provide a higher degree of assurance that the mobile device and the public display are at the same place because of the difficulty in moving the mobile device to match the display. The movement of the target can be complex; for example, a ball can be bouncing in two dimensions. In some implementations, the movement of the target may include several different shapes (e.g., a circle, square, triangle, trapezoid, or other polygons or shapes). As another example, a game such as "Whack-a-Mole" may be displayed on the public display. A user may play the game with the user's mobile device to associate mobile device with the public display. The movement of the user's mobile device as the user plays the game may be compared, for example by the cloud service, with an expected movement based on where the public display makes a "mole" appear in the game. In some configurations, the cloud service may select a pattern for a particular display such as circle, circle, square, and trapezoid. Other movements with the mobile device may be used according to implementation disclosed herein, such as shaking the mobile device. A user may trace the pattern shown on the public display with a mobile device and the orientation data from the mobile device may be compared to the time at which the pattern was shown on the public display to verify the user's presence of the user in front of the particular display.

Figure 3:
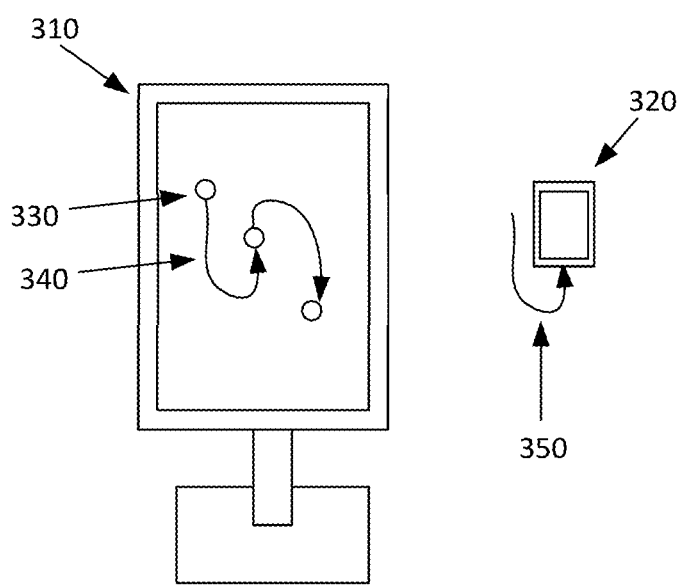
FIG. 3 shows an example of a smartphone mimicking a pattern shown on a public device as disclosed herein.

FIG. 3 shows an example of a phone 320 mimicking the pattern 330, 340 shown on a public device 310. The public device 310 may show a series of dots or hoops 310 and instruct a user to connect the dots 330 or fly a character on the screen through the hoops 330 using the pathway 340 indicated. The user's position relative to the pathway shown on the public device 310 may be indicated with a marker such as a character, a cursor, a symbol, etc. The user may attempt to mimic the pathway 340 with the mobile device 320 as shown at 350.

In an implementation, a web service or cloud service may send an instruction web page to a public device that indicates to the public device a pattern or game in which a target moves. The target may be, for example, the bouncing ball or racecar. A user may load or play the web page from the same cloud service that captures accelerometer data from the user's smartphone or mobile device to capture the overall motion of the device. A user may move or shake the mobile device to match images or sounds on the public device. The mobile device may collect the motion (e.g., orientation) data of the phone and send it to the cloud service. The cloud service may compare the motion of the mobile device (e.g., orientation) with the movement data for the target (e.g., the instructions set to the public device on how to move the target). The cloud service may determine a match exists based on the comparison and send a new web page to the public device and the mobile device. The new web page on the mobile device may indicate that a secure association between the mobile device and the public device has been made. The degree of security required may vary depending on the type of application being run on the public device. The level of security may be adjusted to match the application by utilizing longer or shorter sequences of images and/or sounds for a user to imitate with a mobile device. A less secure key will have a smaller number of features (e.g., images and/or sounds) to match. Moreover, a match does not need to be an exact (e.g., 100% identity) match in order for an association between the public device and the electronic device to be deemed a match. The level of stringency demanded for a match to be determined (e.g., 50% identity or similarity or higher) may be configured as needed for an implementation. A higher the degree of identity or similarity between the target movement data and the physical orientation data may be necessary in some configurations. In the initial interaction in which a mobile device is associated with a public device, a user's identity is not relinquished. This user and/or device anonymity may persist until the user indicates that the user would like to make a purchase, for example, based on content shown on the public device (e.g., purchase concert tickets).

In some configurations, a mobile device may connect to a cloud service that controls many public devices. The mobile device may send the orientation data for the mobile device based on a gesture or motion performed in which the mobile device is moved in an approximate pattern to that shown on the public device. In some instances, the mobile device may prompt the user to enter a directory and/or indicate an approximate location of the user separate from the IMU data (e.g., orientation or motion data from an accelerometer). Based on the approximate location of the user, the cloud service may only compare the mobile device's orientation data to a one or a few targets' movement data (e.g., movement of what is shown on the public device). As another example, a QR code may be present on the public device, that, when scanned by the mobile device, opens the web page that records the accelerometer data and/or identifies a specific public device. Other methods of providing an approximate location of a mobile device relative to a specific public device may be utilized with the implementations disclosed herein.

Figure 4:
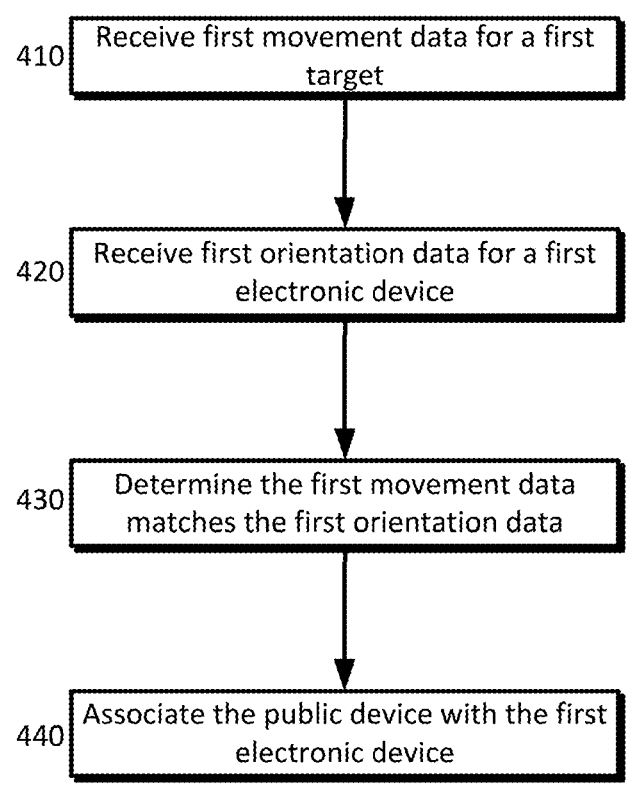
FIG. 4 is an example process for associating an electronic device with a public device based on a comparison of a target's movement data to an electronic device's orientation data as disclosed herein.

In an implementation, an example of which is provided in FIG. 4, a server may receive first movement data for a first target on a display of a public device at 410. A target may be a visual object on the display and it may include an audio component. For example, the target may be a bouncing ball. The movement data for target may be predetermined by a cloud service provided by a server. The server (e.g., the cloud service) may transmit instructions for movement of the target to the public device.

The public device may include a display, a processor, a communication module, and/or at least one speaker. The communication module may receive and send data between the public device, the cloud service, and/or an electronic device (e.g., a mobile phone, a tablet, etc.). The processor may instruct the display to show movement of the target. The processor may indicate to the cloud service that the target has been shown according to the motion the cloud service provided (e.g., it may send movement data for the target). The public device may be positioned in any area viewable or accessible to the general public such as in a business, store, mall, etc. The public device is intended to be accessible by one or more individuals per session and would not be used, for example, as a household device.

The server may receive first orientation data for a first electronic device that is distinct from the public device at 420. The orientation data may indicate the electronic device's physical orientation. For example, if a user moves a device from a first point to a second point, the orientation data may indicate a movement in terms of a distance and an angle or as relative coordinates. As described earlier, a user's electronic device may connect to a web page that can obtain or receive the electronic device's orientation data. The orientation data may indicate the motion of the electronic device based on the device's IMU or accelerometer. The server may be physically distinct and in distinct locations from the public device and the electronic device. The server operating a cloud service may compare the movement data for the target as received by from the public device and/or as sent by the server (or cloud service) to the orientation data of the electronic device.

In some configurations, the first movement data for the target shown on the display of the public device and/or the first orientation data for electronic device may be time-stamped. For example, the first movement data may be generated at a first time and the first orientation may be generated at a second time. The first time and the second time may be transmitted by the respective devices to the server and/or web application as described earlier. The server may determine a difference between the time-stamp associated with the movement data and that of the orientation data. In some configurations, the server may determine that the difference is not below a timing threshold value (e.g., two minutes or other such predetermined timing threshold). The server may reject a match determination if the difference between the first time and the second time exceeds the timing threshold.

A first identifier corresponding to the public device may be received by the server, for example, with the first movement data. A second identifier corresponding to the first electronic device may be similarly received. The first identifier may uniquely identify the public device from one or more other public devices. An alphanumeric code may form an identifier and may be associated with the movement data for the target such that the server may know the location of the public device. The electronic device may transmit a second identifier with the orientation data. The server may utilize the first identifier and second identifier as a component of a hash table to uniquely identify multiple electronic devices associated with multiple public devices. In some instances, the target may be shown on multiple public devices. The comparison of the first movement data to the first orientation data may be based on the first identifier and the second identifier. For example, the first identifier may be utilized to discern a first public display from a second public display showing the same target (therefore having the same movement data).

The first movement data may be determined to match the first orientation data at 430. As described above, the server or cloud service may send an indication to the electronic device that is associated with the public device. The public device and the electronic device may be associated with one another at 440. The manner by which the electronic device and the public device may be associated may include, for example, the electronic device and/or the public device sharing data between each other or via a third party service (e.g., a cloud service). The data may include navigational input from the electronic device to the display, purchase information for content on the display, data related to the ongoing session between the public device and the electronic device, etc. The association between the public device and the electronic device may permit the user to interact or control what is displayed on the sign. For example, a user may browse a selection of electronic books and download one to the user's electronic device. The interaction between the public device and the electronic device may be via the cloud service. For example, the cloud service may direct the display to show a web page and may redirect the user's web browser to the same web page. As the user moves the electronic device, the movement may be relayed, via the cloud service, to the public device and appear thereon. The public device may be kiosk at which a user may make a purchase of electronic content or other goods and/or services (e.g., concert tickets). A user may browse the content a kiosk offers subsequent to the association therewith. In some configurations, the association between the public device and the first electronic device may allow the two devices to directly communicate with one another. For example, the first electronic device may connect to a wireless access point to which the sign is connected if the server determines the first orientation data matches the first movement data as described above. Thus, a command may be received from the electronic device (e.g., a purchase or download request) and an indication of the command may be sent, directly or indirectly, to the public device.

The server may receive second movement data for a second target on the display of the public device. For example, the sign may be compatible with multiple users simultaneously interacting with it. The public device may show two different targets with two different shapes and/or patterns. The server may receive second orientation data for the second electronic device. The server may determine that the second movement data matches the second orientation data and associate the public device with the second electronic device. The public device may have an electronic device-specific marker for each device connected to it. The public device may allocate a portion of its display to each user. For example, if two users' electronic devices are connected, the display may devote half of its display to each user.

Figure 5:
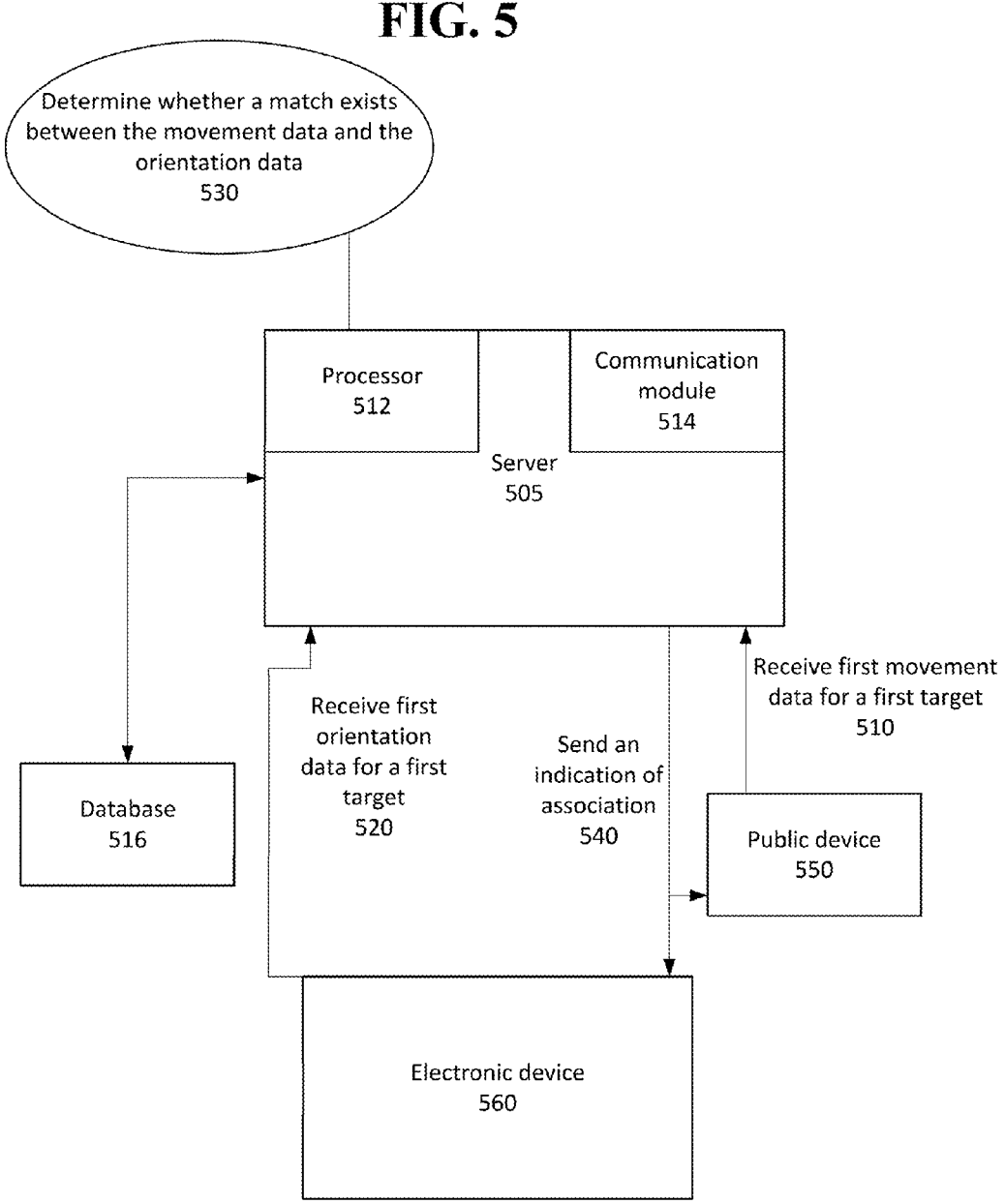
FIG. 5 shows an example system for associating an electronic device with a public device based on a comparison of a target's movement data to an electronic device's orientation data as disclosed herein.

According to an implementation of a system, as shown in the example in FIG. 5, a server 505 may be configured to receive a first movement data for a first target on a display of a public device 550 at 510 as described above. The server 505 may include a processor 512, a communication module 514, and be connected to a database 516. The database 516 may store target pattern data that can be accessed by a cloud service operating on the server 505. The database 516 may store one or more targets' movement data and/or orientation data of one or more electronic devices 560. The communication module 514 may send and/or receive transmissions to or from the public device 550 and/or the electronic device 550. The server 505 may be configured to receive a first orientation data for a first electronic device 550 that is distinct from the public device at 520. The server 505 may determine that the first movement data matches the first orientation data at 530 and associate the public device 550 with the first electronic device 560 at 540 as described earlier. In some configurations, the server 505 may send movement data for the first target to the public device 550 and compare the sent movement data to the received orientation data to determine whether a match exists.

A stringency or tolerance requirement for a match between the movement data and the orientation data may be predetermined. For example, a threshold level of variance and/or standard deviation may be established in a pattern comparison algorithm. For any comparison of movement data and orientation data, if the determined degree of match or similarity is below the threshold level, then it may be deemed insufficient to be deemed a match and an association between the public device and the electronic device may be denied. For example, orientation data that is only 90% similar to the movement data may be deemed a sufficient match for an association to be made between the public device and the electronic device. Similarly, a user may only attempt to match a portion of the target's movement with the electronic device. A threshold may be established for the minimum portion (e.g., length) of a pattern to be required for a match to be determined. For example, if a bouncing ball is shown on the public device, and each bounce of the ball is at a different height and/or direction, a user may begin attempting to mimic pattern of the bouncing ball with the electronic device midway through the ball's pattern. That is, if the apex of each bounce is plotted as coordinates, each apex of a bounce may have at least one different x and/or y coordinate value. The system may perform a comparison between the movement data of the target and the orientation data for the electronic device despite having orientation data for only a portion of the pattern performed by the target. As another example, the public device may show a sequence of shapes and ask a user to trace the shapes with the user's mobile device. If a user only traces a portion of a square shape, a complete triangle shape, a complete oval shape, and a complete trapezoid shape, the system may determine that a match exists between the movement data and orientation data for the triangle, oval, and trapezoid. Thus, the system may receive more orientation data and/or movement data than is necessary for it to perform a match between the two data types.

In some configurations, a cloud service may be an intermediary between the server as shown in FIG. 5, for example, and the electronic device and public device. For example, the cloud service may communicate to each device independent of the other. The cloud service may operate a web site to which the electronic device and the public device connect. The cloud service may transmit data received from each device to the server and the server may perform the comparison of the movement data and the orientation data. The server may indicate to the cloud service that a match has been detected between the public device and the electronic device. In response to the indication of a match, the cloud service may indicate to the electronic device that is associated with the public device. The public device's display may show a different interface which may be manipulated or controlled by the user's mobile device, for example. The user's mobile device, upon receiving an indication of a match, may be directed to a web page through which the mobile device's movement may be translated into navigation inputs for the web page interface shown on the public display. For example, a movement of the mobile device to the left may move a cursor to the left on the public device. A user may make a selection of content by, for example, shaking the mobile device.

Figure 6:
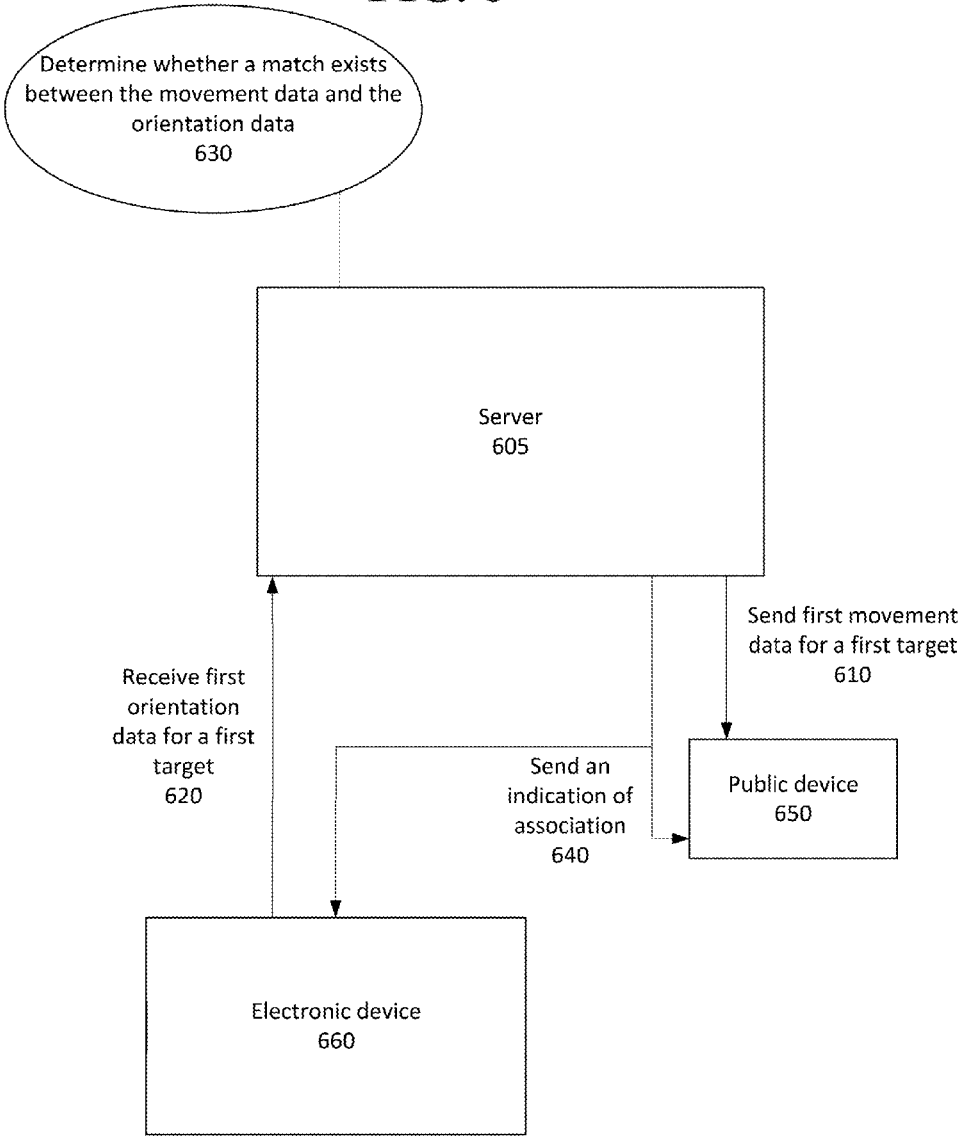
FIG. 6 shows an example system in which a server sends target movement data to a public device for display. The target movement data may be compared to orientation data from an electronic device to associate the public display with the electronic device as disclosed herein.

A system is disclosed in an implementation that includes a server as described earlier. An example of the system is provided in FIG. 6. The server 605 may be configured to send or dispatch first movement data for a first target to a public device 650 that includes a display at 610. The public device 650 may utilize the target data to generate an image for display to a viewing audience. Thus, the public device may receive movement data for the target and display a movement of the first target based on the movement data. The server 605 may receive first orientation data for a first electronic device 660 at 620 as previously described. The electronic device 660, the server 605, and the public device 650 may each be physically distinct devices that communicate with one another, directly or indirectly, through a wireless protocol (e.g., cellular radio, Internet communication, a wireless access point, etc.). The public device 650 and the electronic device 660 may be proximate to one another and at a location that is distinct from that of the server 605. The server 605 may determine that the first movement data matches the first orientation data at 630 and associate the public device 650 with the first electronic device 660 at 640 as described earlier.

Figure 7:
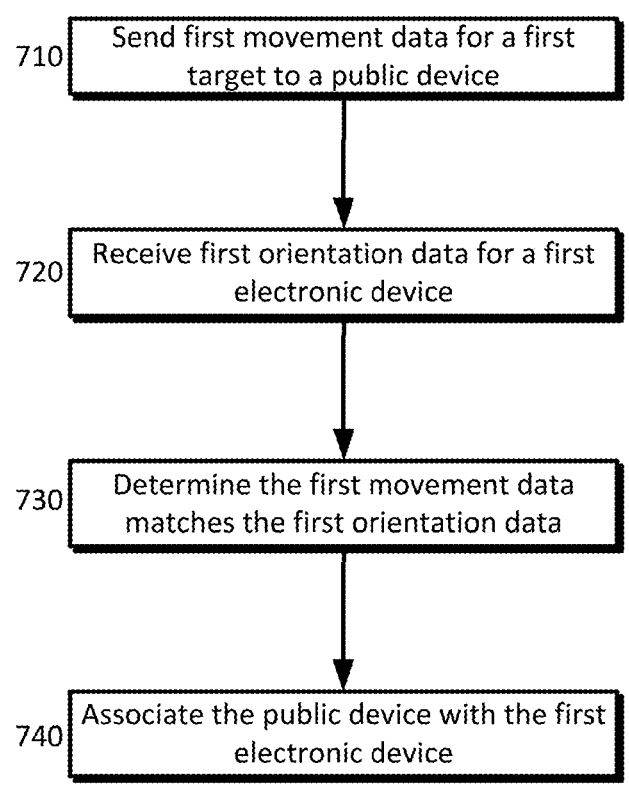
FIG. 7 shows an example process in which a server sends target movement data to a public device for display and determines whether or not the orientation data from an electronic device is similar to the target movement data as disclosed herein.

In an implementation, an example of which is provided in FIG. 7, a server may send or provide instructions for first movement data for a first target to a public device at 710 as described above. The public device may include a display on which the first target (e.g., a bouncing ball) is shown. For example, the public device may receive instructions to display a racecar making turns on a race track. The user wishing to connect or interact with the sign may be instructed to drive the race car by moving the user's electronic device (e.g., a smartphone) as though it were a steering wheel. The server may receive first orientation data for a first electronic device that is distinct from the public device at 720. The server may be at a different physical location than the public device and the first electronic device. For example, the public device and the first electronic device may be co-located (e.g., within three meters of one another) and the server may be located in a different country from those two devices. The server may determine that the first movement data matches the first orientation data 730. The public device may be associated with the first electronic device at 740. The association may be based on the determination that the first movement data matches the first orientation data.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
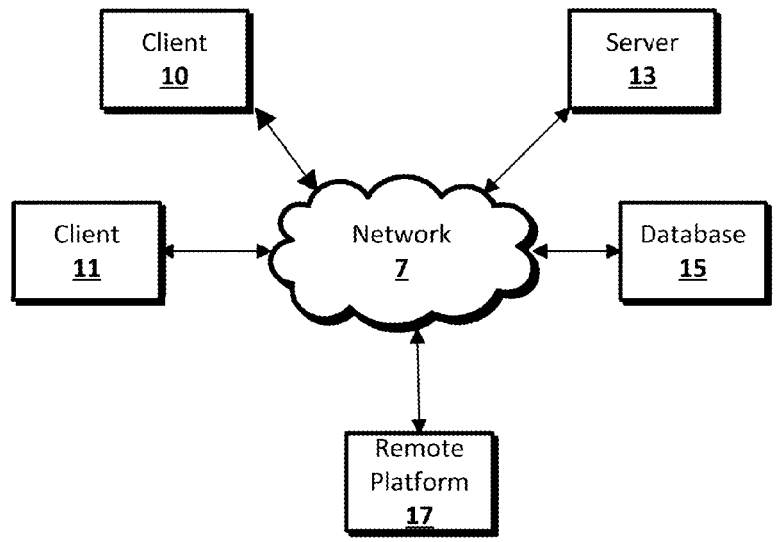
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
transmitting an instruction for a computing device to move one or more visual targets on a display associated with the computing device;
receiving motion data corresponding to motion of a mobile computing device;
determining that (i) the motion of the mobile computing device is associated with the motion of one or more of the visual targets on the display, and (ii) a difference between a first time when the one or more visual targets are moved on a display associated with the computing device and a second time when the motion data was received is less than a predetermined duration; and
in response to determining that (i) the motion of the mobile computing device is associated with the motion of the one or more of the visual targets on the display, and (ii) the difference between a first time when the one or more visual targets are moved on a display associated with the computing device and a second time when the motion data was received is less than a predetermined duration, pairing the mobile computing device with (i) the display, or (ii) the computing device associated with the display.

2. The method of claim 1, wherein determining that the motion of the mobile computing device is associated with the motion of the one or more of the visual targets on the display of the computing device comprises determining that the motion of the mobile computing device matches the motion of the one or more of the visual targets on the display of the computing device.

3. The method of claim 2, wherein determining that the motion of the mobile computing device matches the motion of the one or more of the visual targets on the display of the computing device comprises determining that a difference between a motion of the mobile computing device and a motion of the one or more of the visual targets on the display of the computing device is less than a predetermined threshold.

4. The method of claim 1, wherein pairing the mobile computing device with the display of the computing device comprises pairing the mobile computing device with a particular sub-region of the display of the computing device.

5. The method of claim 1, wherein one or more other sub-regions of the display of the computing device are paired with one or more other corresponding mobile computing devices.

6. The method of claim 1, wherein the visual target on the display of the computing device comprises a ball or a vehicle that moves across the display in a predefined pattern.

7. The method of claim 1, wherein pairing the mobile computing device with the computing device associated with the display comprises storing an identifier associated with the mobile computing device.

8. A system, comprising:
one or more computers programmed to perform operations comprising:
transmitting an instruction for a computing device to move one or more visual targets on a display associated with the computing device;
receiving motion data corresponding to motion of a mobile computing device;
determining that (i) the motion of the mobile computing device is associated with the motion of one or more of the visual targets on the display, and (ii) a difference between a first time when the one or more visual targets are moved on a display associated with the computing device and a second time when the motion data was received is less than a predetermined duration; and
in response to determining that (i) the motion of the mobile computing device is associated with the motion of the one or more of the visual targets on the display, and (ii) the difference between a first time when the one or more visual targets are moved on a display associated with the computing device and a second time when the motion data was received is less than a predetermined duration, pairing the mobile computing device with (i) the display, or (ii) the computing device associated with the display.

9. The system of claim 8, wherein determining that the motion of the mobile computing device is associated with the motion of the one or more of the visual targets on the display of the computing device comprises determining that the motion of the mobile computing device matches the motion of the one or more of the visual targets on the display of the computing device.

10. The system of claim 9, wherein determining that the motion of the mobile computing device matches the motion of the one or more of the visual targets on the display of the computing device comprises determining that a difference between a motion of the mobile computing device and a motion of the one or more of the visual targets on the display of the computing device is less than a predetermined threshold.

11. The system of claim 8, wherein the motion data corresponding to the motion of the one or more of the visual targets on the display of the computing device is generated at a first time and the motion data corresponding to the motion of the mobile computing device is generated at a different second time, and wherein determining that the motion of the mobile computing device matches the motion of the one or more of the visual targets on the display of the computing device comprises determining that a difference between the first time and the different second time is less than a predetermined threshold.

12. The system of claim 8, wherein pairing the mobile computing device with the display of the computing device comprises pairing the mobile computing device with a particular sub-region of the display of the computing device.

13. A computer storage medium encoded with a computer program, the program comprising instructions that when executed by data processing apparatus cause the data processing apparatus to perform operations comprising:
transmitting an instruction for a computing device to move one or more visual targets on a display associated with the computing device;
receiving motion data corresponding to motion of a mobile computing device;
determining that (i) the motion of the mobile computing device is associated with the motion of one or more of the visual targets on the display, and (ii) a difference between a first time when the one or more visual targets are moved on a display associated with the computing device and a second time when the motion data was received is less than a predetermined duration; and
in response to determining that (i) the motion of the mobile computing device is associated with the motion of the one or more of the visual targets on the display, and (ii) the difference between a first time when the one or more visual targets are moved on a display associated with the computing device and a second time when the motion data was received is less than a predetermined duration, pairing the mobile computing device with (i) the display, or (ii) the computing device associated with the display.

14. The computer storage medium of claim 13, wherein determining that the motion of the mobile computing device is associated with the motion of the one or more of the visual targets on the display of the computing device comprises determining that the motion of the mobile computing device matches the motion of the one or more of the visual targets on the display of the computing device.

15. The computer storage medium of claim 14, wherein determining that the motion of the mobile computing device matches the motion of the one or more of the visual targets on the display of the computing device comprises determining that a difference between a motion of the mobile computing device and a motion of the one or more of the visual targets on the display of the computing device is less than a predetermined threshold.

16. The computer storage medium of claim 13, wherein pairing the mobile computing device with the display of the computing device comprises pairing the mobile computing device with a particular sub-region of the display of the computing device, wherein one or more other sub-regions of the display of the computing device are paired with one or more other corresponding mobile computing devices.

17. A computer-implemented method comprising:
transmitting an instruction for a computing device to move one or more visual targets on a display associated with the computing device;
receiving motion data corresponding to motion of a mobile computing device;
determining that the motion of the mobile computing device is associated with the motion of one or more of the visual targets on the display;
storing an identifier that identifies a computing device from a plurality of computing devices, and selecting the identified computing device to pair with the mobile computing device, and wherein transmitting the instruction for the computing device to move the one or more of the visual targets on a display associated with the computing device occurs after the identified computing device is selected; and
in response to determining that the motion of the mobile computing device is associated with the motion of the one or more of the visual targets on the display, pairing the mobile computing device with (i) the display, or (ii) the computing device associated with the display.

18. A computer-implemented method comprising:
transmitting an instruction for a computing device to move one or more visual targets on a display associated with the computing device;
receiving motion data corresponding to motion of a mobile computing device;
determining that the motion of the mobile computing device is associated with the motion of one or more of the visual targets on the display;
in response to determining that the motion of the mobile computing device is associated with the motion of the one or more of the visual targets on the display, pairing the mobile computing device with (i) the display, or (ii) the computing device associated with the display;
while the display or the computing device associated with the display is paired with the mobile computing device:
transmitting an instruction for the computing device to move one or more other visual targets on the display associated with the computing device;
receiving motion data corresponding to the motion of a different mobile computing device;
determining that the motion of the different mobile computing device is associated with the motion of one or more of the other visual targets on the display; and
in response to determining that the motion of the other mobile computing device is associated with the motion of the one or more of the other visual targets on the display, pairing the other mobile computing device with (i) the display, or (ii) the computing device associated with the display, while continuing to pair the computing device associated with the display to the mobile computing device.

19. A computer-implemented method comprising:
transmitting an instruction for a computing device to move one or more visual targets on a display associated with the computing device;
receiving motion data corresponding to motion of a mobile computing device;
determining that the motion of the mobile computing device is associated with the motion of one or more of the visual targets on the display; and
in response to determining that the motion of the mobile computing device is associated with the motion of the one or more of the visual targets on the display, pairing the mobile computing device with (i) the display, or (ii) the computing device associated with the display, wherein one or more other sub-regions of the display of the computing device are paired with one or more other corresponding mobile computing devices.

* * * * *